United States Patent

Carney et al.

[11] Patent Number: 5,970,410
[45] Date of Patent: Oct. 19, 1999

[54] CELLULAR SYSTEM PLAN USING IN BAND-TRANSLATORS TO ENABLE EFFICIENT DEPLOYMENT OF HIGH CAPACITY BASE TRANSCEIVER SYSTEMS

[75] Inventors: Ronald R. Carney, Palm Bay; Victor D. Poor, Melbourne, both of Fla.

[73] Assignee: AirNet Communications Corp., Melbourne, Fla.

[21] Appl. No.: 08/607,588

[22] Filed: Feb. 27, 1996

[51] Int. Cl.[6] .............................. H04Q 7/38; H04Q 7/36; H04Q 7/28; H04Q 7/20

[52] U.S. Cl. ........................ 455/446; 455/447; 455/448; 455/449; 455/450

[58] Field of Search ..................... 455/447, 446, 455/422, 562, 449, 24, 11.1, 517, 448, 450; 370/315, 319, 480, 481, 279, 482, 281

[56] References Cited

U.S. PATENT DOCUMENTS

| | | | |
|---|---|---|---|
| 3,965,300 | 6/1976 | Markl | 370/481 |
| 4,768,187 | 8/1988 | Marshall | 370/481 |
| 5,115,514 | 5/1992 | Leslie | 455/24 |
| 5,187,806 | 2/1993 | Johnson et al. | 455/15 |
| 5,251,218 | 10/1993 | Stone et al. | 370/481 |
| 5,278,537 | 1/1994 | Kelley | 370/481 |
| 5,357,559 | 10/1994 | Kallin et al. | 455/449 |
| 5,509,028 | 4/1996 | Marque-Pucheu | 370/279 |
| 5,533,030 | 7/1996 | Schiffel et al. | 370/481 |

*Primary Examiner*—Wellington Chin
*Assistant Examiner*—Keith Ferguson
*Attorney, Agent, or Firm*—Farkas & Manelli PLLC; Russell O. Paige

[57] ABSTRACT

A wireless system architecture whereby high efficiency broadband transceiver systems can be deployed at an initial build out stage of the system in a cost-efficient manner. A home base station location is identified within each cluster of cells and rather than deploy a complete suite of base station equipment at each of the cells in the cluster, inexpensive translator units are located in the outlying cells serviced by the home base station in which low traffic density is expected. The translators are connected to directional antennas arranged to point back to the home base station site. The translators are deployed in such a way which meshes with the eventually intended frequency reuse for the entire cluster of cells. The translator to base station radio links operate in-band, that is, within the frequencies assigned to the service provider. For example, the available frequency bands are divided into at least two sub-bands, with a first sub-band is assigned for use as a home base station to translator base station communication link and a second sub band is assigned for use by the mobile station to translator communication link. If desired, a third sub-band can then be used for deployment of base transceiver systems in the conventional fashion where the base station equipment located at the center of a cell site communicates only with mobile stations located within that cell.

11 Claims, 7 Drawing Sheets

CELLULAR SYSTEM PLAN USING IN BAND-TRANSLATORS TO ENABLE EFFICIENT DEPLOYMENT OF HIGH CAPACITY BASE TRANSCEIVER SYSTEMS

FIELD OF THE INVENTION

This invention relates generally to wireless communication systems and in particular to a system architecture that makes use of in band-translators deployed in peripheral cells of a cell cluster.

BACKGROUND OF THE INVENTION

The ever increasing need for wireless communication services such as Cellular Mobile Telephone (CMT), Digital Cellular Network (DCN), Personal Communication Services (PCS) and the like, typically requires the operators of such systems to serve an ever increasing number of users in a given service area. As a result, certain types of base station equipment including high capacity broadband transceiver systems (BTS) have been developed which are intended to service a relatively large number of active mobile stations in each cell. Such broadband transceiver system equipment can typically service, for example, ninety-six simultaneously active mobile stations in a single four-foot tall rack of electronic equipment. This base station equipment typically costs less than $2000 to $4000 per channel to deploy, and so the cost per channel serviced is relationally low.

When coupled with efficient frequency reuse schemes, such as that described in a co-pending U.S. patent application Ser. No. 08/331,455 entitled "A Method For Obtaining Times One Frequency Reuse in Communication Systems" filed by John R. Doner on Oct. 31, 1994 and assigned to AirNet Communications Corporation who is the assignee of this application, maximum efficiency in densely populated urban environments is obtained. According to that arrangement the cells are each split into six radial sectors and frequencies are assigned to the sectors in such a manner as to provide the ability to reuse each available frequency in every third cell. Although this frequency reuse scheme is highly efficient, it requires at least two complete sets of multi-channel transceiver equipment such as in the form of a broadband transceiver system (BTS) to be located in each cell.

However, when a wireless system first comes on line, demand for use in most of the cells is relatively low, and it is typically not possible to justify the cost of deploying complex multichannel broadband transceiver system equipment based only upon the initial number of subscribers. Because only a few cells at high expected traffic demand locations (such as at a freeway intersection) will justify the expense to build-out with high capacity broadband transceiver system equipment, the service provider is faced with a dilemma. He can build-out the system with less expensive narrowband equipment initially, to provide some level of coverage, and then upgrade to the more efficient equipment as the number of subscribers rapidly increases in the service area. However, the initial investment in narrowband equipment is then lost. Alternatively, a larger up front investment can be made to initially deploy high capacity equipment, so that once demand increases, the users of the system can be accommodated without receiving busy signals and the like. But this has the disadvantage of carrying the money cost of a larger up front investment.

Some have proposed various techniques for extending the service area of a given cell. For example, U.S. Pat. 4,727,490 issued to Kawano et al. and assigned to Mitsubishi Denki Kabushiki Kaisha, discloses a mobile telephone system in which a number of repeater stations are installed at the boundary points of hexagonally shaped cells. The repeaters define a small or minor array which is, in effect, superimposed on a major array of conventional base stations installed at the center of the cells. With this arrangement, any signals received in so-called minor service areas by the repeaters are relayed to the nearest base station.

Another technique was disclosed in U.S. Pat. 5,152,002 issued to Leslie et al., and assigned to Orion Industries, Inc., wherein the coverage of a cell is extended by including a number of so-called "boosters" arranged in a serial chain. As a mobile station moves along an elongated area of coverage, it is automatically picked up by an approaching booster and dropped by a receding booster. These boosters, or translators, use highly directive antennas to communicate with one another and thus ultimately via the serial chain with the controlling central site. The boosters may either be used in the mode where the boosted signal is transmitted at the same frequency as it is received or in a mode where the incoming signal is retransmitted at a different translated frequency.

Unfortunately, each of these techniques have their difficulties. With the first method, which uses an array of repeaters co-located with the primary cell sites, the implementation of diversity receivers becomes a problem. Specifically, certain types of cellular communication systems, particularly those that use digital forms of modulation, are susceptible to multi-path fading and other distortion. It is imperative in such systems to deploy diversity antennas at each cell site. This repeater array scheme makes implementation of diversity antennas extremely difficult, since each repeater simply forwards its received signal to the base station, and diversity information as represented by the phase of the signal received at the repeater, is thus lost.

The second scheme works fine in a situation where the boosters are intended to be laid in a straight line along a highway, a tunnel, a narrow depression in the terrain such as a ravine or adjacent a riverbed. However, there is no teaching of how to efficiently deploy the boosters in a two-dimensional grid, or to share the available translated frequencies as must be done if the advantages of cell site extension are to be obtained throughout an entire service region, such as a large city.

DESCRIPTION OF THE INVENTION

OBJECTS OF THE INVENTION

It is an object of this invention to provide a cellular system architecture whereby high efficiency broadband transceiver systems can be deployed at an initial build-out stage of the system in a cost-efficient manner.

Another object is to provide a migration strategy for a wireless system which not only is inexpensive to build-out initially but also provides for efficient deployment of high-capacity systems in later years of system build-out.

A further object is to provide a wireless system in which hardware deployment costs are strictly driven by user demand throughout the stages of system deployment.

Another object is to provide such a system in which the initial low cost build-out footprint of cells is the same as in a completely built out system, to avoid the need for reconfiguring cells and associated antenna sites.

Yet another object is to minimize the backhaul costs and the need for associated secondary transmit licenses.

A still further object is to permit the implementation of conventional diversity receiving schemes.

SUMMARY OF THE INVENTION

Briefly, the invention is an architecture for a wireless communication system in which the cells are grouped into clusters and the available frequency spectrum is divided into frequency reuse groups. A home cell location is identified within each cluster and a base station located at or near the home cell site serves the multiple cells in the reuse cluster.

Rather than deploy a complete suite of base station equipment at each of the cells in the cluster, translator units are located in the outlying cells serviced by the home base station in which low traffic density is expected. The translators are connected to directional antennas arranged to point back to the home base station site. The translators are deployed in such a way which meshes with the eventually intended frequency reuse for the entire cluster of cells.

The translator to base station radio links operate in-band, that is, within the frequencies assigned to the service provider. For example, the service provider is a Personal Communication Services (PCS) provider in the United States having the use of a pair of 15 MHz bands (one for down links and one for up links). Each of the available frequency bands are divided into at least two sub-bands. A first sub-band is assigned for use as a home base station to translator base station communication link. A second sub band is assigned for use by the mobile station to translator communication link. If desired, a third sub-band can then be used for deployment of base transceiver systems in the conventional fashion where the base station equipment located at the center of a cell site communicates only with mobile stations located within that cell.

Because the cost of modifying mobile station equipment is prohibitive, the mobile stations communicate with the translator base stations in the conventional fashion, that is, the down link channel frequencies (from base station to mobile station) are selected from the lower band of frequencies, and the uplink channel frequencies (from mobile station to base station) are selected from the upper band of frequencies. However, the links between the home base station and the translator base stations are inverted, in the sense that the lower band of frequencies is used for the uplink from translator to base station, and the upper band of frequencies is used for the down link from the home base station to the translator base station.

In one variation, the home base station may make use of omni-directional receiving equipment and in such case the home base station is located in the center of the cell cluster. In another implementation, the home base station may make use of sectorized antennas and the cell reuse group is assigned frequencies as in a fully sectorized arrangement.

Efficient frequency reuse may be effectively planned for at even the initial system build-out stages. For example, an "N=12" reuse pattern may be used which permits the deployment of twelve (12) cells around a central cell site in an approximately equidistant fashion. The home cell site then uses omni-directional antennas to communicate with the translators. The N=12 pattern may then be repeated throughout the service area by inverting the orientation of the alternating columns of cell groups. In this manner, compatibility with an reuse pattern which may be upgraded to higher reuse densities on a cell by cell basis is maintained.

In another arrangement, the N=12 pattern is simply repeated across the service area and the center cell is sectorized at initial system build-out.

BRIEF DESCRIPTION OF THE DRAWINGS

For a more complete understanding of the invention and its novel advantages and features, reference should be made to the accompanying drawings in which.

DETAILED DESCRIPTION OF A PREFERRED EMBODIMENT

Figure 1:
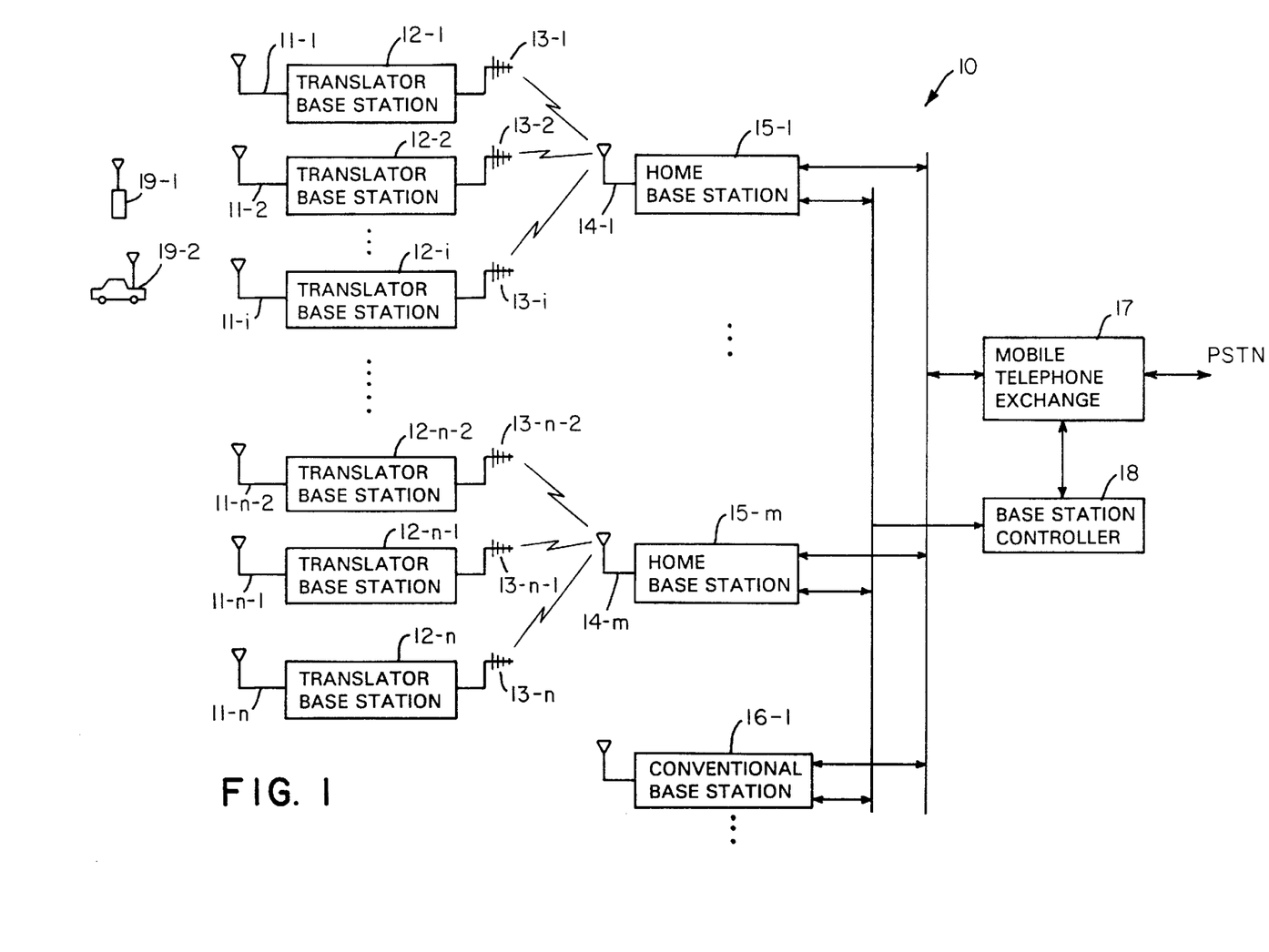
FIG. 1 is a block diagram of the components of a wireless communication system that makes use of in-band translator base stations, home base stations, conventional base stations, and mobile stations according to the invention.

FIG. 1 is a block diagram of the components of a wireless communication system such as a Personal Communication System (PCS) or similar cellular system in which translator base stations are deployed in peripheral cells of a cell cluster to concentrate radio signal traffic to and from a home base station. In-band radio frequency channel assignments are made to the translator base stations, home base stations, and mobile stations in a particular fashion that will be described shortly.

The system 10 includes translator omni-directional antennas 11-1, 11-2, 11-3, . . . , 11-n-2, 11-n-1, 11-n (collectively, the omni-directional antennas 11), translator base stations (translators) 12-1, 12-2, . . . , 12-n, translator directional antennas 13-1, 13-2, . . . , 13-n, home base station antennas 14-1, . . . , 14-m, home base stations 15-1, . . . 15-m, one or more conventional base stations 16-1, a mobile telephone exchange 17, one or more base station controllers 18, and mobile stations 19-1, 19-2.

The system 10 provides voice and or data communication between the mobile stations 19 and the Public Switch Telephone Network (PSTN) by sending signals over radio channels. In the particular embodiment of the invention being described, the radio signaling protocol, or "air interface" may, for example, be the PCS-1900 standard promulgated by the Telecommunications Industry Association (TIA) in the United States [which is identical in relevant aspects to the Global System for Mobile Communication (GSM) standard promulgated in Europe and elsewhere by the European Telecommunication Standards Institute (ETSI)].

The translator base stations 12-1, 12-2, . . . , 12-i are each located in what would normally be considered approximately the center of a cell site among a group or cluster of cells. The translators 12 receive radio signals from the mobile stations 19 and forward them to the associated home base station 15-1. Likewise, radio signals originating at the home base station 15-1 are forwarded by the translators 12 to the mobile stations 19.

The translator "base stations" 12, each associated with a respective cell, do not perform demodulation and modulation functions within each cell as would a conventional base station. Rather, they serve to frequency-translate signals received from the mobile stations 19 located in its respective cell, and then direct such signals on a different frequency to the home base station 15-1 associated with the particular translator base station 12-1. The translators 12 also perform the inverse function to translate signals received from the home base station to direct them to the mobile stations 19. The specific manner of translation will be discussed below in connection with FIG. 2 and 4.

The home base stations 15-1, . . . , 15-m and conventional base station 16-1 are responsible for demodulating radio signals and connecting them to the Public Switched Telephone Network (PSTN) through the mobile exchange 17. The base stations 15-1, . . . , 15-m and conventional base station 16-1 also modulate signals received from the PSTN through the mobile exchange 17 to format them for transmission over the air through the translators 12. The conventional base station 16-1 is typically located substantially in the center of a particular cell of the system 10. In a manner that will be described shortly the home base stations 15-1, . . . , 15-m may or may not be located in the center of a particular cell.

In contrast, the conventional base station 16-1 operates as in the prior art to directly service the mobile units 19 located in or traveling through its associated cell.

The base station controller 18, of which there may be more than one, has a number of functions. The primary function is to manage the logical connections made between mobile stations 19 and the PSTN. In order to do so, the base station controller 18 assigns transmit and receive radio carrier frequencies to each individual mobile station 19, translators 12, home base stations 15, and conventional base station 16. Typically, there may be five to twenty base stations 15 and/or 16 serviced by a single base station controller 18.

The present invention is in the specific manner in which the base station controller 18 assign radio carrier frequencies for use by the mobile stations 19, translators 12, home base stations 15, and conventional base station 16. The frequency assignments are made to the home base stations 15 and conventional base stations 16 so that they do not interfere with one another.

Specifically, in the up link direction, that is for signals transmitted from mobile station 19 to the home base station 15-1, a signal originating at a mobile station 19 is first received at an omni-directional antenna 11-2 at an exemplary translator 12-2. The translator 12-2 then converts the radio carrier frequency of the signal received from the mobile station 19 to a different carrier frequency. The carrier frequency conversion is in-band that is, as will be described shortly in connection with FIG. 2, the translation is wholly within the frequency bandwidth allocated to the service provider for wireless service. The translated signal is then sent out on an antenna 13-2 such as a Yagi antenna which provides a highly directional link back to the associated home base station 15-1. The translated signal is then received on by the antenna 14-1 associated with the home base station 15-1 and processed in the conventional manner.

Processing in the down link direction from the home base station 15-1 to the mobile station 19 is analogous. In particular, the signal from the PSTN is modulated by the home base station 15-1 and then transmitted on the antenna 14-1. The directional antenna 13-2 provides a highly directional radio link between the home base station 14-1 and the translator 12-2. The translator base station 12-2 then receives the down link signal, which is then translated to a frequency normally assigned for the use by the mobile station 19. This translated signal is then output on the omni-directional antenna 11-2 and then ultimately received by the mobile station 19.

Figure 2:
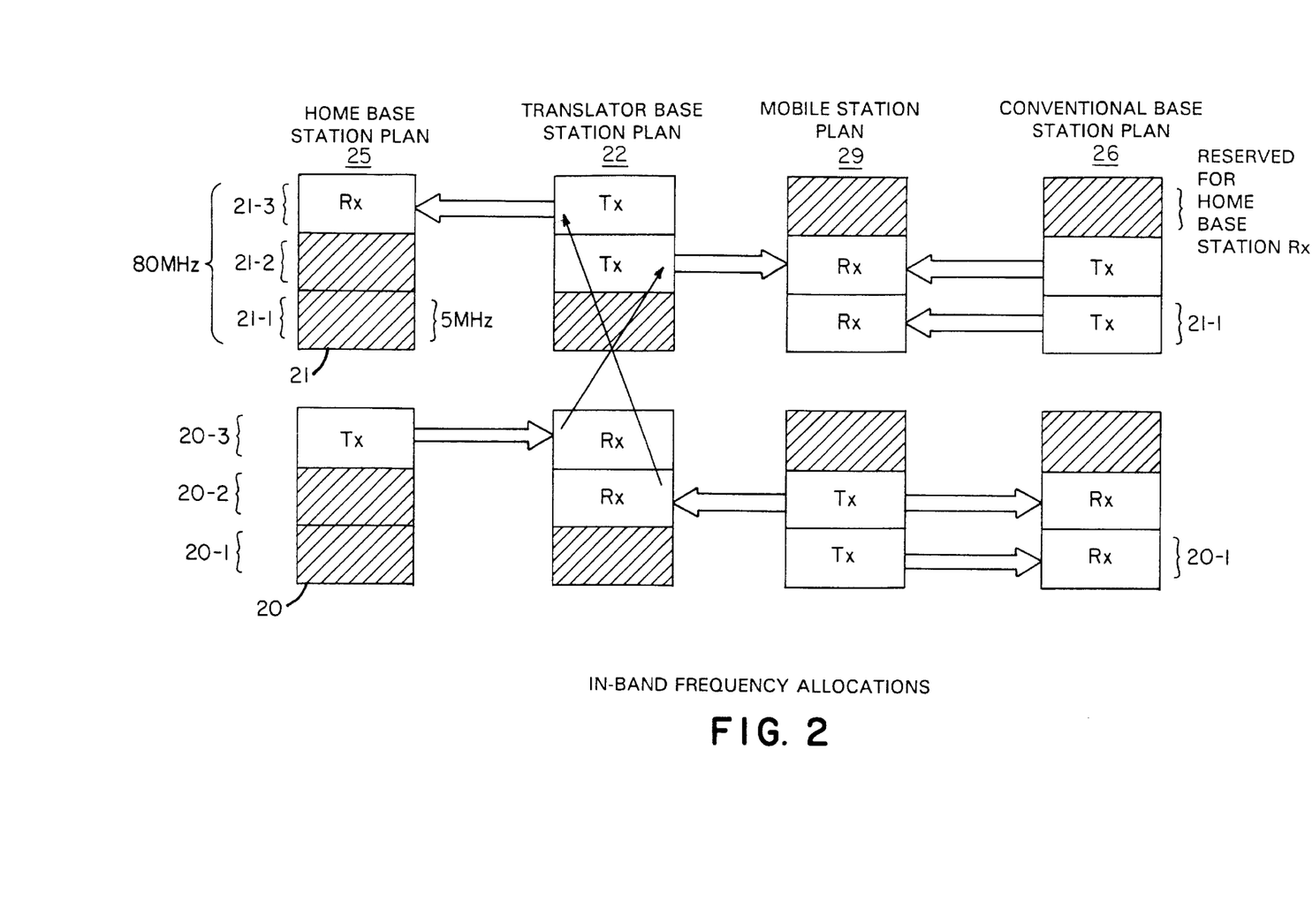
FIG. 2 is a diagram of a frequency assignment plan which is implemented according to the invention showing the ranges of radio channels typically assigned to the home base station, translator base station, mobile station and conventional base station.

FIG. 2 shows the in-band frequency assignments made to the home base station 15, the translator base station 12, the mobile station 19 and the conventional base station 16 as required to practice this invention. The vertical axis in the diagram represents frequency. The four columns of boxes represent frequency allocations for the home base station plan 25, the translator base station plan 22, the mobile station plan 29, and the conventional base station plan 26. The left side of the diagram illustrates a representation of the frequency allocations typically made available to a wireless service provider, including a lower band of frequencies 20 and an upper band of frequencies 21. For a PCS provider in the United States, 15 MHz of spectrum is allocated in each of the lower bands 20 and upper bands 21. The lower 15 MHz of spectrum, a contiguous block of spectrum in a range from 1850 to 1910 MHz, is typically used for uplinks, or mobile station to base station transmissions, and the upper 15 MHz block of frequency spectrum, located 80 MHz away, in the 1930 to 1990 MHz range, is typically used for down links. A conventional base station 16-1 is thus assigned to transmit on the upper band of frequencies 21 and to receive on the lower band of frequencies 20.

In accordance with the invention each of the up link bands 20 and down link bands 21 are divided into a number of sub-bands. In the illustrated embodiment there are three frequency sub-bands, 20-1, 20-2, 20-3 each representing 5 MHz of the up link band. Similarly, the down link band 21 is divided into three sub-bands 21-1, 21-2, and 21-3, each also containing 5 MHz of spectrum.

As shown in the right hand side of FIG. 2, the two lowest sub-bands 20-1 and 21-1 are assigned for use by the conventional base station 16-1 in the conventional manner. Thus, the lowest band 20-1 is reserved for use as a direct uplink between the mobile stations 19 and the conventional base stations 16-1. Similarly, the lowest sub-band 21-1 of the down link band 21 is reserved for the direct links between the conventional base station 16-1 and the mobile station 19.

Frequency assignments are made to the home base station 15 such that the up link from the translators 12 to the home base station 15 makes use of the upper sub-bands 21-3 of the upper band 21. The down link between home base station 15 and translators 12 similarly uses the upper most sub-band 20-3.

The middle sub-band 21-2 of the upper spectrum portion 21 is used as the down link from the translators 12 to the mobile stations 19 and the middle sub-band 20-2 of the lower spectrum 20 is used as the up link from the mobile station 19 to the translators 12.

The cross hatched lines in the home base station frequency assignment plan 25, that is, the lower and middle sub-bands 20-1, 20-2, 21-1, and 21-2 are not in use by the home base station 15. The cross hatched lines in the translator base station plan 22 also indicate that the lowest sub-bands 20-1 and 21-1 are not used by the translators 12.

It can now be understood from FIG. 2 how frequencies are assigned to mobile stations 19, home base stations 15 and translators 12 according to the invention. In particular, in the uplink direction, a mobile station 19 is assigned a particular transmit channel within the range of sub-band 20-2. The signal is then received from the mobile station 19 by the translator base station 12. The translator base station 12 then translates the received signal by 85 MHz to a corresponding channel in the upper sub-band 21-3. The signal is then transmitted to the home base station 15.

In the downlink direction, from the home base station 15 to the mobile station 19, a channel is first selected in the upper sub-band 20-3 for transmitting to the translator 12. The signal received by the translator 12 is then translated by 75 MHz, to a frequency in the middle sub-band 21-2, for transmission to the mobile station 19.

As a result, the mobile stations 19 and conventional basestations 16-1 thus always continue to transmit and receive in frequency bands as they would in a conventional wireless system. Only the frequency plan 25 for the home base station 15 is "inverted" in the sense that it transmits in a band of frequencies 20 which is normally reserved for receiving in a conventional base station 16-1, and in that it receives signals in a band 21 which is normally reserved for base station transmitting.

Division of the available spectrum into three sub-groups makes it possible for conventional base stations 16 to be mixed with the translator base stations to provide for maximum flexibility in building up the system 10.

Figure 3:
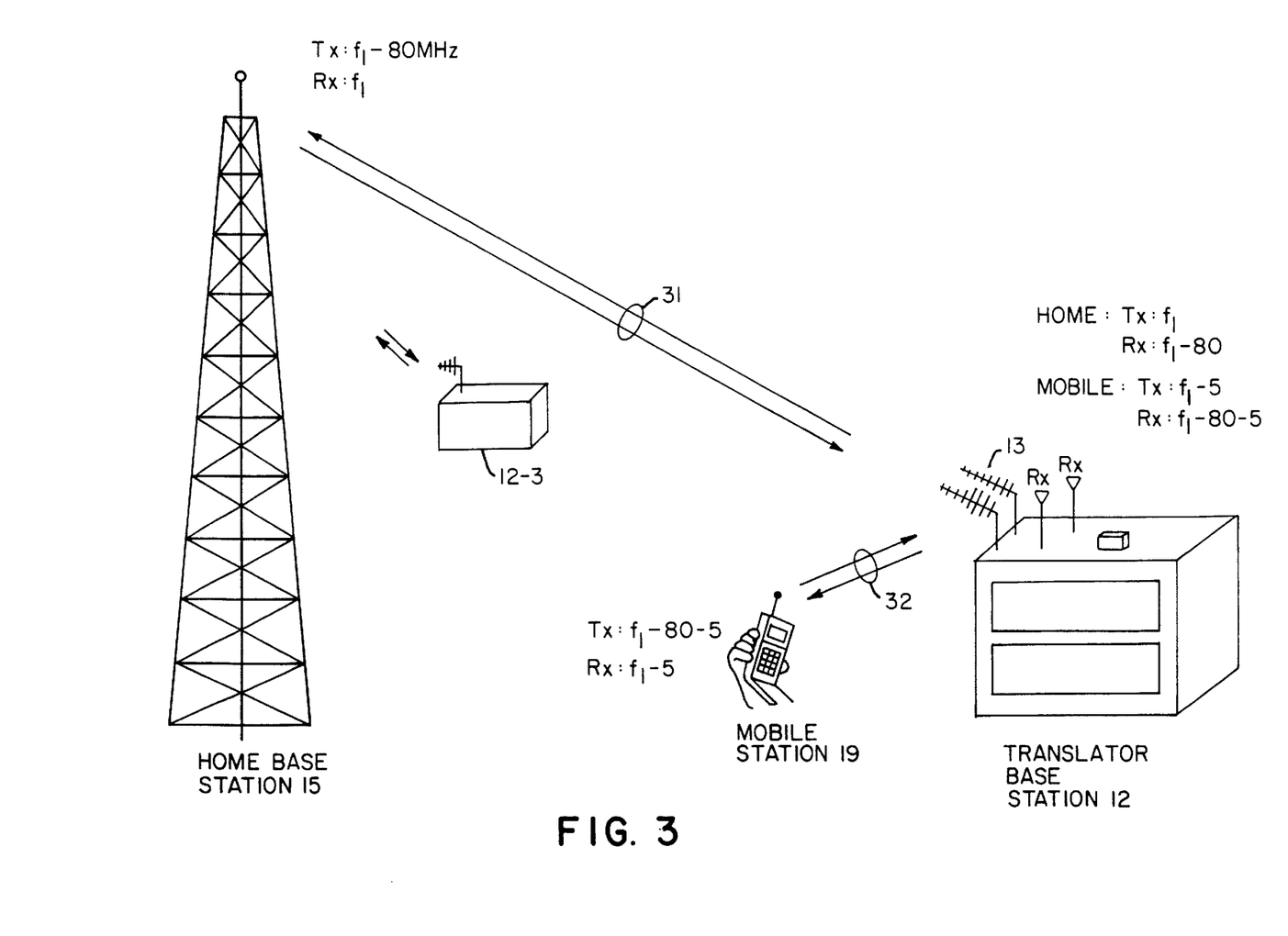
FIG. 3 is an illustration of the typical arrangement of the home base station, mobile station and translator base station illustrating how communication links are deployed in an up link direction from the mobile station through the translator to the home base station, and in a down link direction from the home base station through the translator to the mobile station.

FIG. 3 is a diagram illustrating the manner in which signals are transmitted from the mobile station 19 through the translator base station 12 and ultimately to the associated home base station 15 in a down link direction, that is from the home base station 15 to the mobile station 19. For a given voice channel, the home base station 15 receives signals from the translator 12 on a carrier frequency, F1, and transmits on a carrier frequency F1 minus B MHz, where B is the sub-band size (5 MHz in this example) and S is the separation between lower and upper bands (80 MHz in this example). The mobile station 19 then receives that signal on carrier frequency (F1-B) and transmits on a translated frequency (F1-S-B).

As illustrated, the translator base station 12 has two bi-directional signaling links, one link 31 for communication with the home base station 15, and one link 32 for communication with the mobile station 19. Link 31 permits the translator 12 to receive and transmit with respect to the home base station 15 on frequencies (F1-S) and F1 respectively. This transmission is carried out with directional antennas 13 as previously mentioned.

The link 32 between the translator 12 and the mobile station 19 is such that the translator 12 transmits signals to the mobile station 19 on a frequency (F1-B) and receives signals from the mobile station on a frequency (F1-S-B). Another exemplary translator base station 12-3 serviced by the home base station 15-1 will use another set of frequencies similarly selected from the same band.

Figure 4:
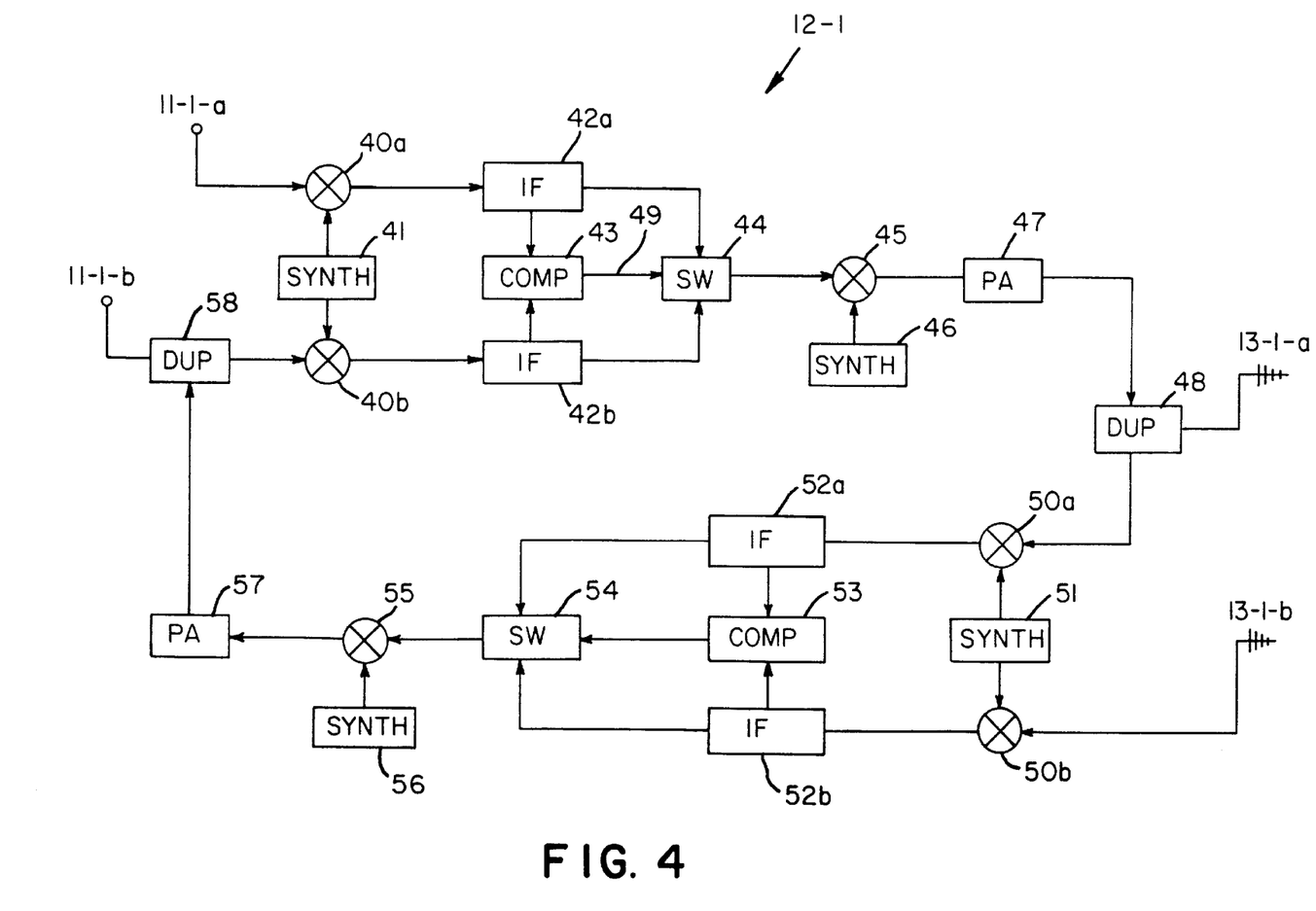
FIG. 4 is a circuit diagram of the components of the translator as implemented to provide diversity reception in both the mobile station to translator base station link as well as in the translator to home base station link.

FIG. 4 is a detailed block diagram of components of an exemplary translator base station 12. The translator 12 shifts the carrier frequency of the signals received from one link to the appropriate transmit frequency for the other link. The illustrated translator implements frequency diversity for each of the links.

Translator 12-1 thus may be implemented using a pair of omni-directional antennas 11-1-A, 11-1-B for the mobile station link 32 and a pair of directional antennas 13-1-A and 13-1-B for the home base station link 31. A first signal processing chain shifts the carrier frequency of signals received from the mobile unit on the omni-directional antennas 11-1, and consists of a duplexer 58, a pair of mixers 40A, and 40B, a synthesizer 41, a pair of intermediate frequency (IF) filters 42A, and 42B, a comparator 43, a switch 44, an output mixer 45, an output synthesizer 46, a power amplifier 47 and a duplexer 48. The input mixers 40A and 40B, synthesizer 41, and IF filters 42A, 42B implement a conventional heterodyne receiver. A portion of the signal generated by the IF filters 42A and 42B is fed to the comparator 43 to provide a logic signal 49 indicating which of the two signal paths, that is either the signal path originating from antenna 11-1-A or the signal path originating from the antenna 11-1-B (as received through the duplexer 58) is being received with greater signal power. This logic signal 49 then operates the switch 44 to either select the output of the IF filter 42A or IF filter, 42B to be output to the mixer 45 and output power amplifier 47. The power amplifier 47 then forward the signal for transmission through the duplexer 48 to the directional antenna 13-1-A.

Similarly, signals received from the home base station on the pair of diversity antennas 13-1-A, and 13-1-B, are fed to the mixers 50A, and 50B, synthesizer 51 and IF filters 52A, and 52B. Again a pair of heterodyne receivers is implemented to produce two IF signals representative of the signals received by each of the antennas 13-1-A and 13-1-B. The comparator 53 and switch 54 then feed to the mixer 55. The signal is then finally fed through the power amplifier 57 and duplexer 58 and out to the omni-directional antenna 11-1-B.

Because no signal uses a radio frequency which is in use in the same cell for more than one type of link, the translator 12 may thus be used to take advantage of diversity reception for both the home base to translator link 31 and the mobile to translator link 32. This is unlike prior art systems that use repeaters where diversity information is either not preserved or requires multiple signal paths to be preserved.

Figure 5:
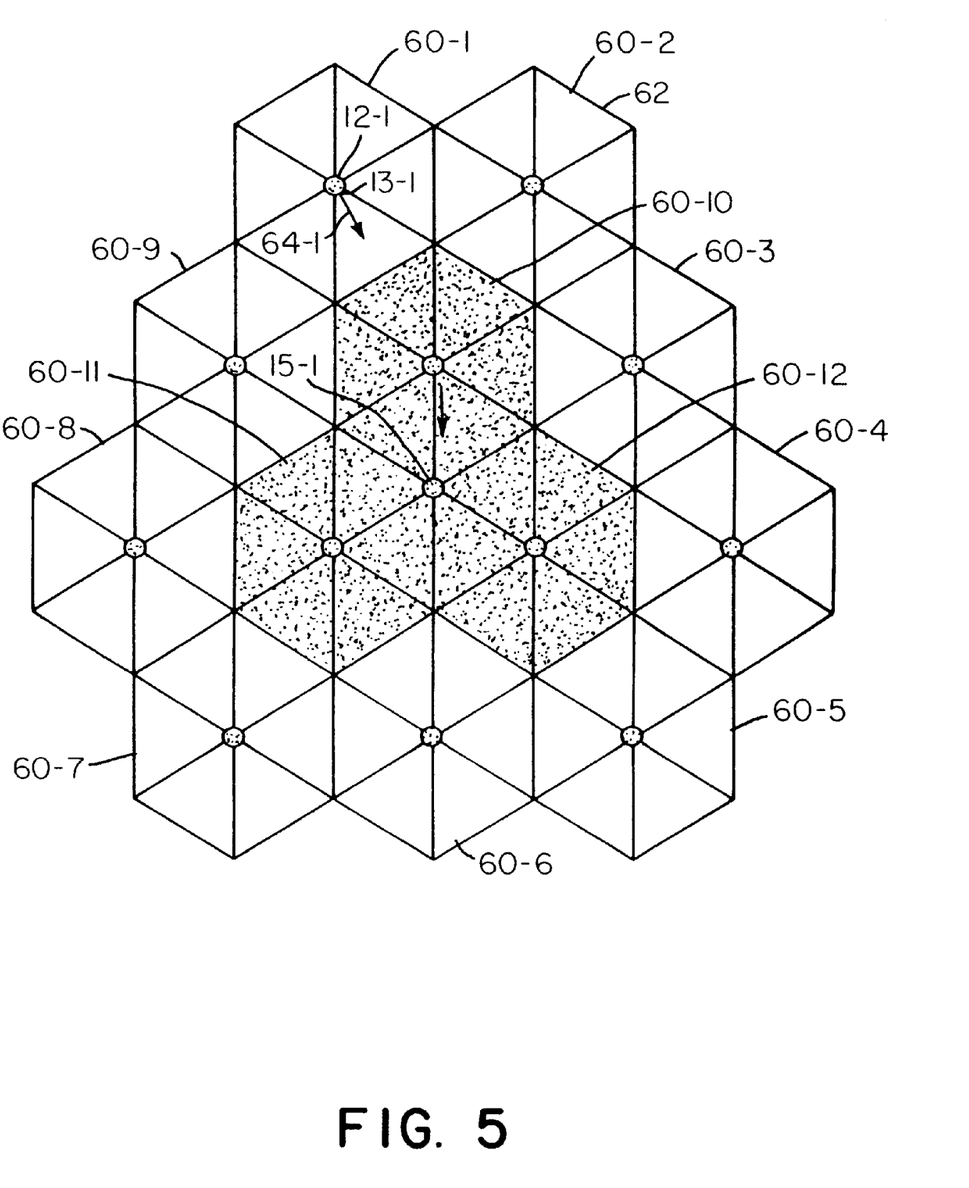
FIG. 5 is one possible layout of home base station and translators implemented according to the invention in cell clusters where traffic densities are low, using a frequency reuse factor of twelve.

FIG. 5 shows the preferred layout of a cluster 62 of cells using one possible arrangement of the home base station 15-1 and its associated translator base stations 12. The particular cluster 62 illustrated contains twelve cells 60-1, 60-2, 60-3, . . . 60-12 located as close as possible to a central point. It should be understood however, that other frequency reuse factors greater or lesser than 12 can be accommodated using the invention. Although the cells 60 are shown as six sectored cells it should also be understood that at the initial build-out of the system 10, the cells 60 would not typically be sectorized until such time as the traffic demand in the cell so dictates. The illustrated "N=12" arrangement is shown sectorized to indicate that the system may have the individual cells 62 cut over to a sectorized arrangement to support highly efficient reuse schemes such as N=3.

Each of the cells 60 has a unique group frequency assigned to it. For the example being described, ¹⁄₁₂th of the frequencies are available in each cell; given the 5 MHz sub-bands previously described and assuming PCS 1900 which use 200 kHz channels, two channels are available in each cell (each PCS 1900 radio channel carries up to 8 voice channels).

In the initial build-out phase of the system 10 a translator base station 12-1 is located in the center of the cell 60-1 and likewise a translator base station 12-2, . . . , 12-12 is located in each of the eleven other cells 60-2, . . . , 60-12. A home base station 15-1 is located in the center of the entire twelve cell cluster 62 which may not coincide with the center of one of the cells 60, as shown. In the illustrated cell arrangement, the home base station is located in a vertex of the three innermost cells 60-10, 60-11, 60-12 and not exactly at a cell center.

Considering cell 60-1, the arrow 64-1 indicates the direction in which the directional antennas 13-1 associated with the translator 12-1 are oriented to point back to the home base station 15-1. Although not shown in FIG. 5, each of the other cells 60-2, ..., 60-12 each have a directional antenna pointing back to the home base station 15-1. As a result, any mobile station 19 traveling through any of the cells 60-1, ..., 60-12 in cluster 62 is processed by the home base station 15-1.

Figure 6:
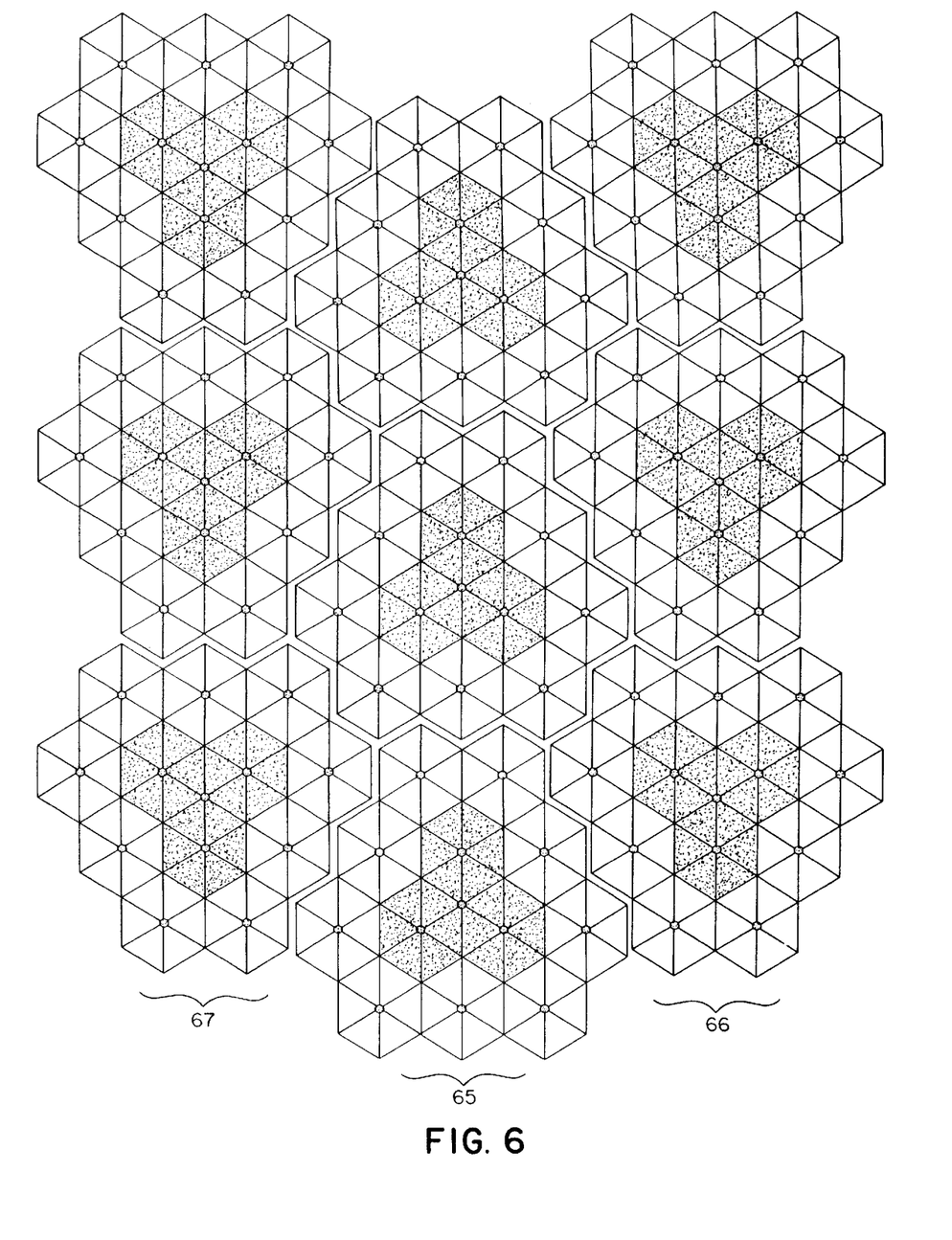
FIG. 6 illustrates how the layout of FIG. 5 can be repeated through out a service area such as throughout a metropolitan trading area (MTA)

The N=12 pattern shown in FIG. 5 is asymmetric in a sense that the area of the cluster is not the same in an upper half as it is in a lower half. As shown in FIG. 6, however, the asymmetric N=12 pattern can be repeated through a given service area by alternating the orientation of cluster columns. Thus in a middle cluster column 65, the cells may be oriented such that the "Y" formed by the three inner cells is upside down. The adjacent cluster columns of these groups, such as columns 66 and 67, may be oriented such that the "Y" is rightside up.

Figure 7:
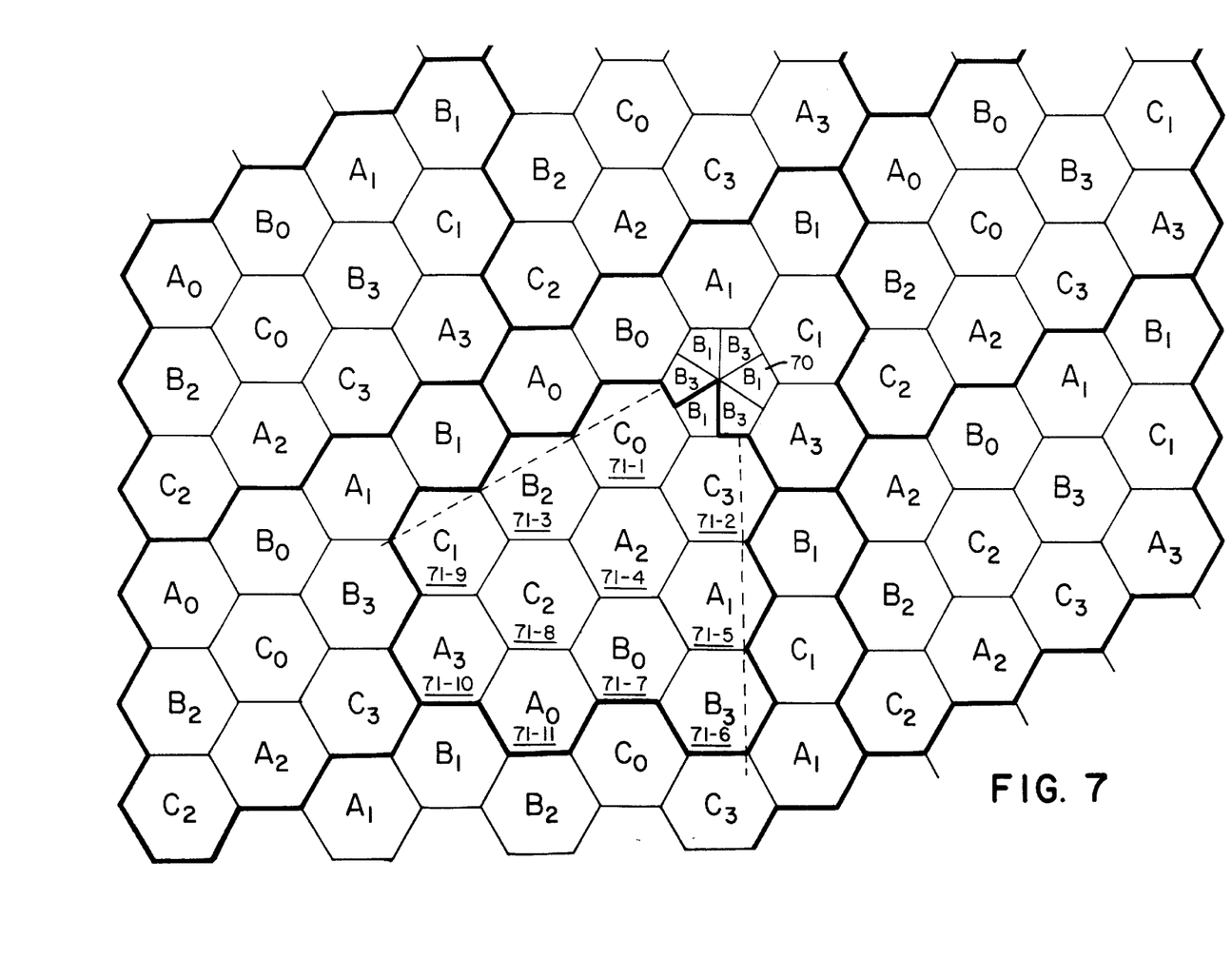
FIG. 7 is an alternative arrangement of home base station and translators overlaid on a frequency reuse pattern which makes use of a sectorized home base station.

FIG. 7 shows an alternate arrangement for the positioning of home base stations 15-1 and translator base stations 12-1, ..., 12-12. In this arrangement, the N=12 pattern is first laid out in any convenient arrangement, rather than the particular configuration in FIG. 5. One of the cells, such as cell 70, is then chosen as the location of the home base station 15-1. This particular cell 70, even at initial system build-out, is split into six sectors and assigned alternating frequency groups among the six sectors, (B1, B3, B1, B3, B1, B3). The translator base stations 12 are deployed in the eleven cells adjacent the center cell 20, and are serviced by the associated sector 71 equipment. For example, translators 12-1, ... 12-12 are deployed in the cells 71-1, ..., 71-11, approximately in the center of each of the cells 71-1, ... 71-11. As the mobile station traffic increases in a particular cell, it may be individually cut over to become a sectional cell in an N=3 pattern.

It is now understood how a wireless communication system may be configured to permit deploying high efficiency broadband transceiver system equipment by using in-band translators laid out in a conventional system footprint. The advantages of the invention may be used to provide to an effective system coverage area without the need for building out more high capacity broadband base transceiver systems than is absolutely necessary. Furthermore, there is no difficulty with implementing directional or diversity antennas so that multi path distortion effects and other problems may be adequately addressed. Backhaul costs also are minimized by taking advantage of the frequency allocations already made to the service provider.

What is claimed is:

1. A wireless communication system consisting of a plurality of cells, the plurality of cells being located substantially adjacent one another, and the wireless communication system operating over a specified frequency range, the wireless communication system making use of a frequency allocation plan that arranges the cells into clusters, with each of the cells in a cluster being assigned for use a subset of an entire band of available carrier frequencies in the specified frequency range, the system comprising:

home base station means including a broadband transceiver system for receiving and transmitting multiple radio signals on multiple carrier frequencies, including means for demodulating said received radio signals and for coupling demodulated signals to a switching means, and means for modulating signals received from the switching means and coupling them for radio transmission on the multiple carrier frequencies;

a plurality of mobile stations located in a service area covered by the cluster of cells, each mobile station transmitting and receiving a radio signal; and a plurality of translator base station means each located in one of said plurality of cells in the cluster, each translator base station means including means for receiving a first radio signal from a mobile station located in the cell and translating a carrier frequency of said first received radio signal to another carrier frequency within the specified radio frequency range to produce a first translated signal and then transmitting said first translated signal to the home base station means, and also including means for receiving a second radio signal from said home base station means and translating a carrier frequency of said second received radio signal to another carrier frequency within the specified radio frequency range, to produce a second translated signal, and then transmitting said second translated signal to said mobile station, such that the carrier frequencies of said first translated signal and said second translated signal are each assigned from different ones of a plurality of groups of the carrier frequencies in the available band of carrier frequencies.

2. A system as in claim 1 wherein the available band of carrier frequencies is divided into an up link portion, for mobile station to base station radio transmission links, and a down link portion, for base station to mobile station radio transmission links, and each of the up link portion and the down link portion of the available band of carrier frequencies is further divided into three sub-bands including a lower, middle, and upper sub-band.

3. A system as in claim 2 wherein the carrier frequency of the first translated signal is selected from the upper sub-band of the down link portion.

4. A system as in claim 3 wherein the carrier frequency of the first radio signal is within the middle sub-band of the uplink portion.

5. A system as in claim 2 wherein the carrier frequency of the second translated signal is selected from the middle sub-band of the downlink portion.

6. A system as in claim 5 wherein the carrier frequency of the second radio signal is within the upper sub-band of the uplink portion.

7. A system as in claim 1 wherein the translator means include directional antennas arranged to point back to a site of the home base station means.

8. A system as in claim 1 wherein the home base station means includes sectorized antenna equipment and the home base station means is located in the center of one of the cells in the cluster.

9. A system as in claim 1 wherein the home base station means includes omni-directional antenna equipment, and the home base station is located in the center of the cell cluster.

10. A system as in claim 9 wherein each cluster contains twelve cells positioned as close as possible about the home base station means, and a pattern of cells formed thereby is repeated throughout a service area as a plurality of columns of clusters, and the orientation of alternate ones of said columns of clusters is inverted.

11. A system as in claim 1 wherein the translator base station means includes diversity receiving means for receiving both the first and second radio signals.

\* \* \* \* \*